(12) United States Patent
Chinda

(10) Patent No.: US 11,368,178 B2
(45) Date of Patent: Jun. 21, 2022

(54) RECEIVER AND RECEIVING METHOD

(71) Applicant: DENSO TEN Limited, Kobe (JP)

(72) Inventor: Takeshi Chinda, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 16/969,050

(22) PCT Filed: Nov. 27, 2018

(86) PCT No.: PCT/JP2018/043632
§ 371 (c)(1),
(2) Date: Aug. 11, 2020

(87) PCT Pub. No.: WO2019/167362
PCT Pub. Date: Sep. 6, 2019

(65) Prior Publication Data
US 2021/0036725 A1 Feb. 4, 2021

(30) Foreign Application Priority Data

Feb. 27, 2018 (JP) .............................. JP2018-033548

(51) Int. Cl.
*H04B 1/10* (2006.01)
*H04B 14/00* (2006.01)

(52) U.S. Cl.
CPC ............. *H04B 1/10* (2013.01); *H04B 14/004* (2013.01)

(58) Field of Classification Search
CPC ................................ H04B 1/10; H04B 14/004
USPC .................................. 375/349–350; 455/307
See application file for complete search history.

(56) References Cited

U.S. PATENT DOCUMENTS

| | | | |
|---|---|---|---|
| 6,347,146 B1* | 2/2002 | Short | H03G 3/345 381/15 |
| 2003/0043897 A1* | 3/2003 | Papanikolaou | H04L 25/03885 375/229 |
| 2005/0137815 A1* | 6/2005 | Quinlan | H03D 3/007 702/75 |
| 2010/0093279 A1* | 4/2010 | Linsky | H04W 52/0245 455/41.2 |

(Continued)

FOREIGN PATENT DOCUMENTS

| | | |
|---|---|---|
| JP | H08-307287 A | 11/1996 |
| JP | 2007-142879 A | 6/2007 |

(Continued)

OTHER PUBLICATIONS

Deguchi et al.; "Let's understand the principle of AM synchronous detection;" 2004; pp. 1-10; retrieved Feb. 5, 2019; http://member.tokoha-u.ac.jp/~kdeguchi/hobby/radio/synchro.pdf.

(Continued)

*Primary Examiner* — Don N Vo
(74) *Attorney, Agent, or Firm* — Oliff PLC

(57) ABSTRACT

A receiver includes a synchronous detection unit, an elimination unit, and an envelope detection unit. The synchronous detection unit synchronously detects a received signal to generate an I-component and a Q-component. The elimination unit eliminates a noise from the I-component based on the Q-component that is generated by the synchronous detection unit. The envelope detection unit envelope-detects the I-component where the noise is eliminated by the elimination unit and the Q-component to generate an output signal.

7 Claims, 6 Drawing Sheets

(56) References Cited

U.S. PATENT DOCUMENTS

| | | | |
|---|---|---|---|
| 2011/0032978 A1* | 2/2011 | Lin ................... | H04L 25/03076 |
| | | | 375/232 |
| 2012/0020389 A1* | 1/2012 | Mikhemar .......... | H04L 27/0014 |
| | | | 375/216 |
| 2018/0074348 A1* | 3/2018 | Fujita ..................... | G02F 1/225 |

FOREIGN PATENT DOCUMENTS

| | | |
|---|---|---|
| JP | 2007-251907 A | 9/2007 |
| JP | 2017-220752 A | 12/2017 |

OTHER PUBLICATIONS

Feb. 19, 2019 Search Report issued in International Patent Application No. PCT/JP2018/043632.

* cited by examiner

|  | OUTPUT SIGNAL A | OUTPUT SIGNAL B | OUTPUT SIGNAL C |
|---|---|---|---|
| PHASE VARIATION | ○ | × | ○ |
| BEAT NOISE | × | ○ | ○ |
| OVER-MODULATION | ○ | ○ | ○ |
| PHASE VARIATION + BEAT NOISE | × | × | ○ |
| PHASE VARIATION + OVER-MODULATION | ○ | × | ○ |
| BEAT NOISE + OVER-MODULATION | × | ○ | ○ |

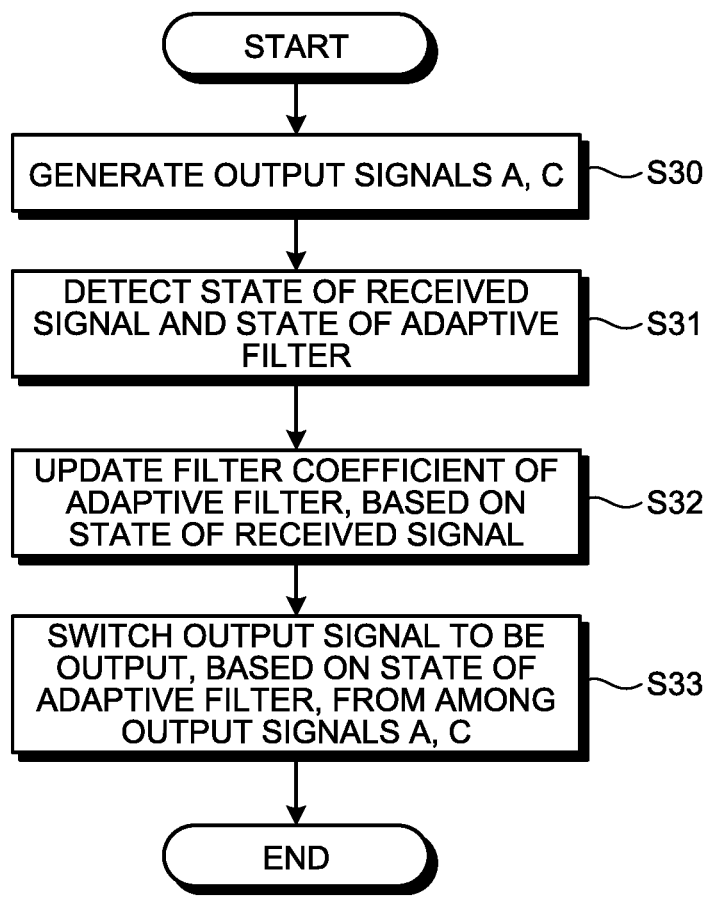

RECEIVER AND RECEIVING METHOD

CROSS-REFERENCE TO RELATED APPLICATION(S)

This application is a national stage application of International Application No. PCT/JP2018/043632 filed on Nov. 27, 2018, which designates the United States, the entire contents of which are herein incorporated by reference, and which is based upon and claims the benefit of priority to Japanese Patent Application No. 2018-033548 filed on Feb. 27, 2018, the entire contents of which are herein incorporated by reference.

FIELD

The present invention relates to a receiver and a receiving method.

BACKGROUND

A variety of receivers have conventionally been proposed that eliminate a noise for an Amplitude Modulation (AM)-modulated received signal (a radio broadcasting wave) (see, for example, Patent Literature 1). For example, a receiver as described above is configured to synchronously detect an AM-modulated received signal to generate an I-component (an in-phase component) and a Q-component (an orthogonal component) and eliminate a noise from the I-component by using the Q-component.

CITATION LIST

Patent Literature

Patent Literature 1: Japanese Patent Application Publication No. 2007-251907

SUMMARY

Technical Problem

However, in a conventional technique, an I-component is directly output as an output signal (a sound signal). Hence, for example, in a case where a variation of a phase in a carrier wave of a received signal is comparative large and a phase shift is caused, it may be impossible to attain synchronization of a phase in synchronous detection, and as a result, degradation of a sound quality of an output signal may be caused.

The present invention is provided by taking the above into consideration and aims to provide a receiver and a receiving method that are capable of reducing degradation of a sound quality of an output signal and eliminating a noise therefrom, even in a case where a variation of a phase in a carrier wave of a received signal is comparatively large.

Solution to Problem

In order to solve a problem as described above and achieve an object, the present invention is a receiver that includes a synchronous detection unit, an elimination unit, and an envelope detection unit. The synchronous detection unit synchronously detects a received signal to generate an I-component and a Q-component. The elimination unit eliminates a noise from the I-component based on the Q-component that is generated by the synchronous detection unit. The envelope detection unit envelope-detects the I-component where a noise is eliminated by the elimination unit and the Q-component to generate an output signal.

Advantageous Effects of Invention

According to the present invention, it is possible to reduce degradation of a sound quality of an output signal and eliminate a noise therefrom, even in a case where a variation of a phase in a carrier wave of a received signal is comparatively large.

BRIEF DESCRIPTION OF DRAWINGS

FIG. 11 is a flow chart that explains switching of an output signal or the like in a receiving process according to a third embodiment.

DESCRIPTION OF EMBODIMENTS

Hereinafter, embodiments of a receiver and a receiving method as disclosed in the present application will be explained in detail, with reference to the accompanying drawings. Additionally, this invention is not limited by embodiments as illustrated below.

First Embodiment

A receiver according to a first embodiment is, for example, a radio and receives an Amplitude Modulation (AM)-modulated radio broadcasting wave (that will be referred to as a received signal below). Additionally, a receiver is not limited to a radio and just has to be a communication device capable of receiving an AM-modulated signal.

Figure 1:
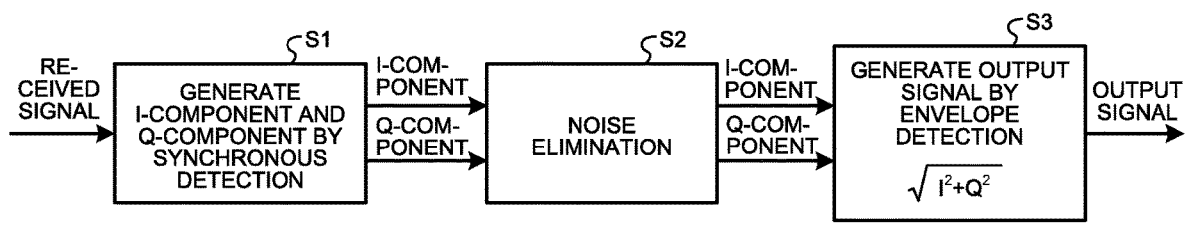
FIG. 1 is a diagram that illustrates an outline of a receiving method according to a first embodiment.

First, an outline of a receiving method according to a first embodiment will be explained by using FIG. 1. FIG. 1 is a diagram that illustrates an outline of a receiving method according to a first embodiment.

As illustrated in FIG. 1, in a receiving method according to the present embodiment, as a received signal is received, such a received signal is synchronously detected to generate an I-component and a Q-component (step S1).

An I-component is a component that is in phase with a carrier wave of a received signal and a component that mainly includes a sound signal and/or a noise. A Q-component is a component with a quadrature phase with respect to a carrier wave of a received signal and a component that mainly includes a noise. Additionally, as described later, in a case where a variation of a phase of a received signal is comparatively large, it may be impossible to attain synchronization of a phase of a Q-component in synchronous detection and a sound signal may be included therein.

Then, a noise is eliminated from an I-component based on a synchronously detected Q-component (step S2). Elimination of a noise will be described later with reference to FIG. 2.

Herein, in a conventional technique, an I-component is directly output as an output signal (a sound signal), so that degradation of a sound quality of such an output signal may be caused. That is, for example, in a case where a receiver is in an area with a weak electric field or a case where it rebroadcasts a radio broadcasting wave that is received from a broadcasting station toward an enclosed space such as a tunnel or receives a so-called radio repeat broadcast in a tunnel, a variation of a phase in a carrier wave of a received signal is comparatively large and a phase shift is readily caused. In such a case, it may be impossible for a receiver to attain synchronization of a phase in synchronous detection, so that degradation of a sound quality of an output signal may be caused.

Hence, in the present embodiment, as illustrated in FIG. 1, an I-component where a noise is eliminated and a Q-component are envelope-detected to generate an output signal (step S3) and it is output to an external device such as a speaker.

Thus, in the present embodiment, envelope detection is further executed after synchronous detection, and in such envelope detection, not only an I-component where a noise is eliminated but also a Q-component is input to generate an output signal.

Envelope detection is less influenced by a phase variation of a received signal than synchronous detection, and hence, a configuration is provided as described above, so that it is possible to, for example, reduce degradation of a sound quality of an output signal and eliminate a noise therefrom, even in a case where a variation of a phase in a carrier wave of a received signal is comparatively large.

Figure 2:
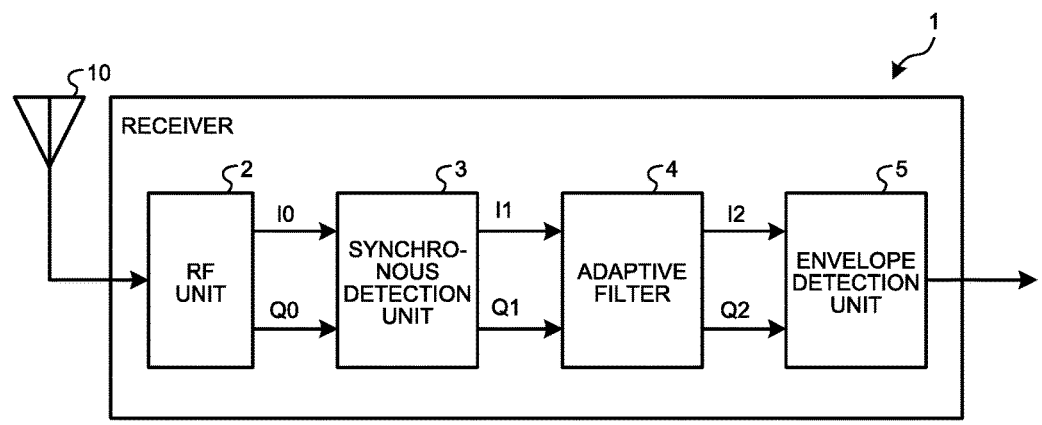
FIG. 2 is a block diagram that illustrates a configuration example of a receiver according to a first embodiment.

Next, a receiver 1 according to a first embodiment will be explained with reference to FIG. 2. FIG. 2 is a block diagram that illustrates a configuration example of the receiver 1 according to a first embodiment.

As illustrated in FIG. 2, the receiver 1 includes a Radio Frequency (RF) unit 2, a synchronous detection unit 3, an adaptive filter 4, and an envelope detection unit 5. Furthermore, an antenna 10 is connected to the receiver 1.

The RF unit 2 applies a process such as quadrature demodulation to a received signal that is received through the antenna 10 to separate, and output to the synchronous detection unit 3, an I-component and a Q-component (where FIG. 2 illustrates a separated I-component as "I0" and Q-component as "Q0").

The synchronous detection unit 3 synchronously detects an I-component and a Q-component that are output from the RF unit 2 and generates a synchronously detected I-component and Q-component. The synchronous detection unit 3 outputs a generated I-component and Q-component to the adaptive filter 4 (where FIG. 2 illustrates a synchronously detected I-component as "I1" and Q-component as "Q1".).

The adaptive filter 4 eliminates a noise from an I-component based on a Q-component that is synchronously detected by the synchronous detection unit 3. Such an adaptive filter 4 is, for example, a filter that self-adapts a filter coefficient by using an optimization algorithm that is referred to as a Least Mean Square (LMS) algorithm.

Therefore, the adaptive filter 4 detects a noise from a Q-component and determines a filter coefficient so as to eliminate a detected noise therefrom, according to an LMS algorithm. Then, the adaptive filter 4 eliminates a noise that is included in an I-component by using a filter with a determined filter coefficient.

The adaptive filter 4 outputs an I-component where a noise is eliminated and a Q-component to the envelope detection unit 5 (where FIG. 2 illustrates an I-component where a noise is eliminated as "I2" and a Q-component as "Q2".). Additionally, the adaptive filter 4 is an example of an elimination unit.

Both an I-component where a noise is eliminated by the adaptive filter 4 and a Q-component are input to the envelope detection unit 5 and such an I-component and Q-component are envelope-detected thereby. Specifically, the envelope detection unit 5 executes envelope detection where an absolute value of an amplitude (for example, a square root of a sum of squares of I and Q components (see S3 in FIG. 1)) is computed based on an I-component and a Q-component and a carrier wave is eliminated by using a filter (for example, a low-pass filter or a high-cut filter). Then, the envelope detection unit 5 generates, and outputs to a non-illustrated external device such as a speaker, an envelope detection signal that is obtained by executing envelope detection, as an output signal.

Figure 3:
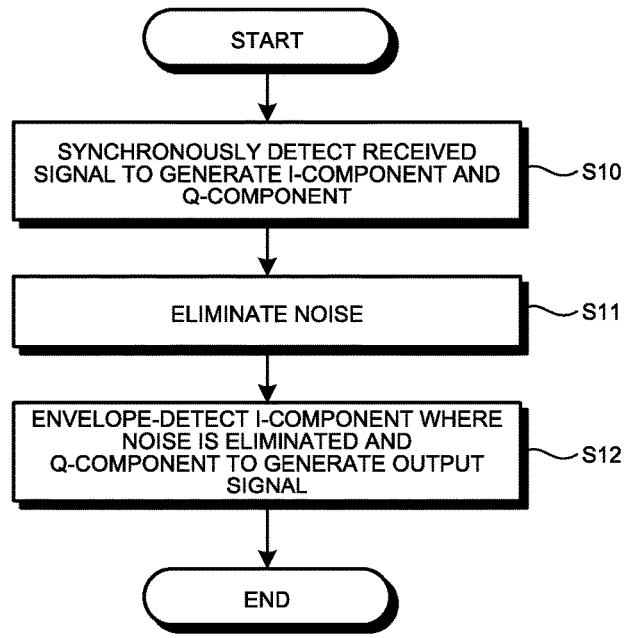
FIG. 3 is a flowchart that explains a receiving process of a receiver according to a first embodiment.

Next, a receiving process of the receiver 1 according to a first embodiment will be explained with reference to FIG. 3. FIG. 3 is a flowchart that explains a receiving process of the receiver 1 according to a first embodiment.

As illustrated in FIG. 3, the receiver 1 synchronously detects a received signal that is received thereby to generate an I-component and a Q-component (step S10). Then, the receiver 1 eliminates a noise from an I-component based on a Q-component that is generated by executing synchronous detection (step S11).

Then, the receiver 1 envelope-detects an I-component where a noise is eliminated and a Q-component to generate an output signal (step S12).

As has been described above, the receiver 1 according to a first embodiment includes the synchronous detection unit 3, the adaptive filter 4, and the envelope detection unit 5. The synchronous detection unit 3 synchronously detects a received signal to generate an I-component and a Q-component. The adaptive filter 4 eliminates a noise from an I-component based on a Q-component that is generated by the synchronous detection unit 3. The envelope detection unit 5 envelope-detects an I-component where a noise is eliminated by an elimination unit and a Q-component to generate an output signal. Thereby, it is possible to reduce degradation of a sound quality of an output signal and eliminate a noise therefrom, even in a case where a variation of a phase in a carrier wave of a received signal is comparatively large.

Second Embodiment

Figure 4:
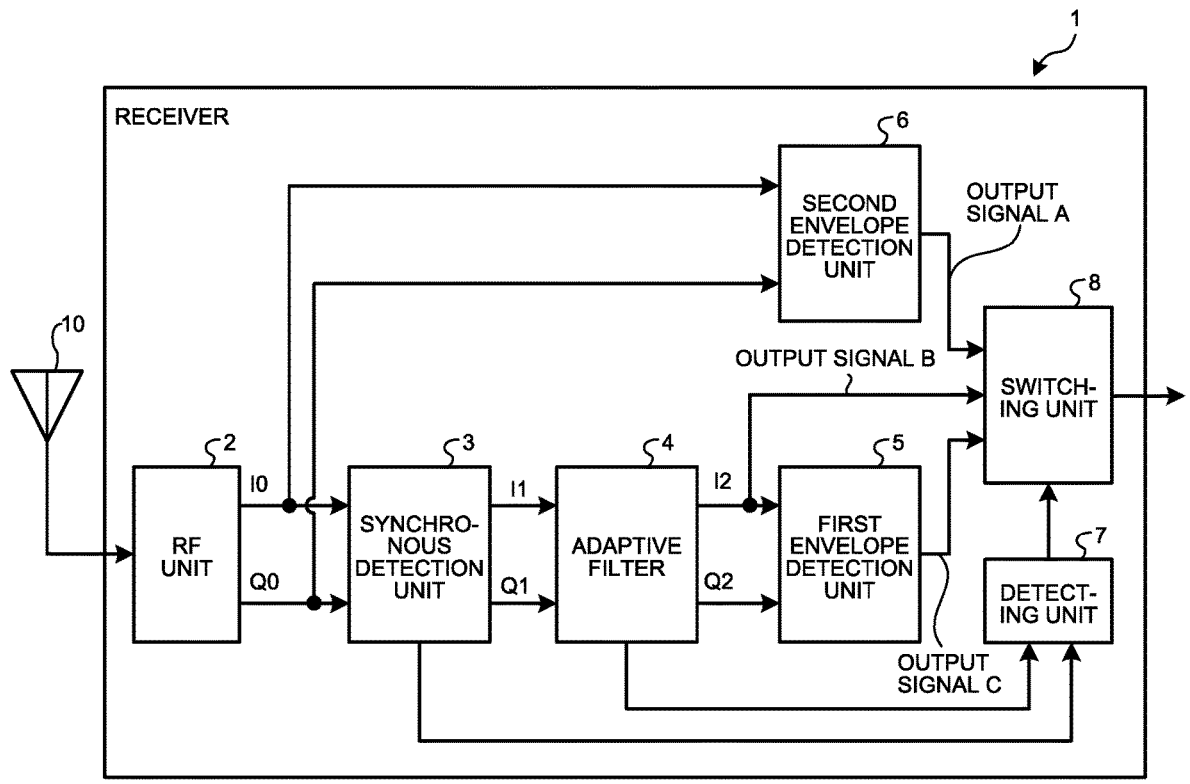
FIG. 4 is a block diagram that illustrates a configuration example of a receiver according to a second embodiment.

Next, a configuration of a receiver 1 according to a second embodiment will be explained with reference to FIG. 4. FIG. 4 is a block diagram that illustrates a configuration example of the receiver 1 according to a second embodiment.

Additionally, hereinafter, a component that is common to that of the previous embodiment will be provided with an identical sign to omit an explanation thereof. Furthermore, the "envelope detection unit 5" in the first embodiment may be described as a "first envelope detection unit 5" below, for distinguishing from another envelope detection unit.

As illustrated in FIG. 4, the receiver 1 according to a second embodiment includes a second envelope detection unit 6, a detecting unit 7, and a switching unit 8 in addition to an RF unit 2, a synchronous detection unit 3, an adaptive filter 4, and a first envelope detection unit 5 as described above.

The second envelope detection unit 6 envelope-detects a received signal to generate an output signal. Specifically, an I-component I0 and a Q-component Q0 where a received signal is separated in the RF unit 2 are input to the second envelope detection unit 6. The second envelope detection unit 6 envelope-detects an input I-component I0 and Q-component Q0 to generate, and output to the switching unit 8, an output signal. Additionally, hereinafter, an output signal that is generated by the second envelope detection unit 6 may be described as an "output signal A".

Furthermore, in a second embodiment, an I-component I2 where a noise is eliminated by the adaptive filter 4 is output to the switching unit 8 as an output signal. Hereinafter, an output signal that is an I-component I2 where a noise is eliminated may be described as an "output signal B".

Furthermore, an output signal that is generated by the first envelope detection unit 5 as has been explained in a first embodiment is output to the switching unit 8. An output signal that is generated by the first envelope detection unit 5 may be described as an "output signal C".

Thus, it is possible for the receiver 1 according to a second embodiment to generate, and output to the switching unit 8, output signals A, B, C, and switch an output signal that is output actually, from among such output signals A, B, C, in the switching unit 8, where this will be described later by using FIG. 8.

The detecting unit 7 detects various types of states of a received signal that are used for a switching process for an output signal in the switching unit 8. For example, it is possible for the detecting unit 7 to detect a state of variation of a phase of a received signal, presence or absence of a noise of a received signal, and presence or absence of over-modulation of a received signal, based on an output of the synchronous detection unit 3 or the adaptive filter 4.

First, a process of detecting a state of variation of a phase of a received signal will be explained. As described above, in a case where a variation of a phase of a received signal is comparatively large, it may be impossible to attain synchronization of such a phase in synchronous detection, so that a sound signal may be included in a Q-component. As a sound signal is included in a Q-component that is a component that mainly includes a noise, an amount of variation of such a Q-component is increased. Thus, there is a correlation between a state of variation of a phase of a received signal and an amount of variation of a Q-component.

Figure 5:
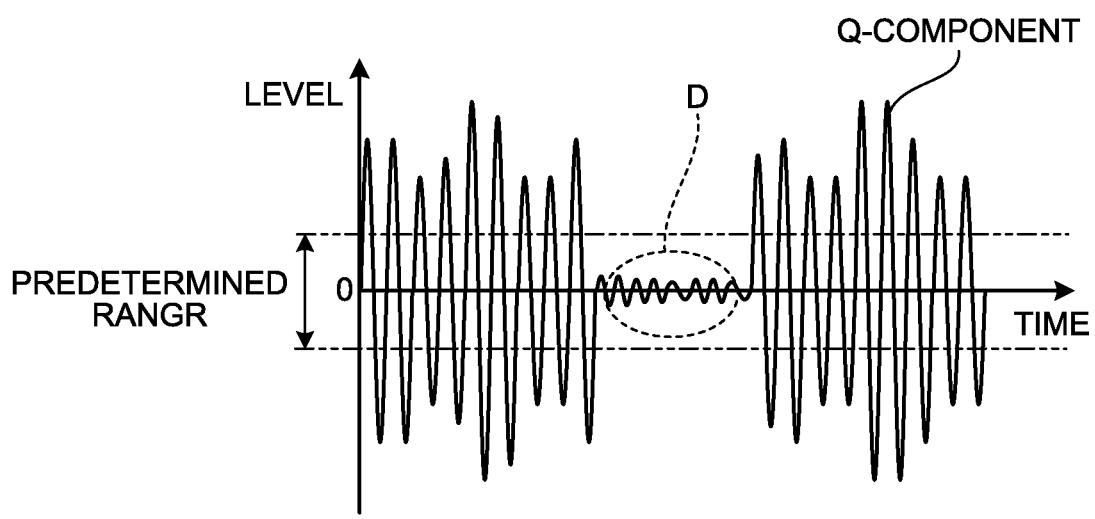
FIG. 5 is a diagram that illustrates a Q-component.

FIG. 5 is a diagram that illustrates a Q-component. As illustrated in FIG. 5, for example, in a case where an amount of variation of a Q-component that is generated by the synchronous detection unit 3 is within a predetermined range, it is possible for the detecting unit 7 to detect, as a state of variation, that a variation of a phase of a received signal is comparatively small (see a closed curve D).

On the other hand, in a case where an amount of variation of a Q-component that is generated by the synchronous detection unit 3 is outside a predetermined range, it is possible for the detecting unit 7 to detect, as a state of variation, that a variation of a phase of a received signal is comparatively large. Additionally, a predetermined range as described above is set at a value that is capable of distinguishing large and small amounts of a variation of a phase of a received signal and is not limited thereto.

Next, a process of detecting presence or absence of a noise of a received signal will be explained. For example, the detecting unit 7 analyzes a frequency spectrum of a received signal to detect presence or absence of a noise of such a received signal. Additionally, a noise that is detected herein is, for example, a beat noise with a particular frequency and is not limited thereto.

Figure 6:
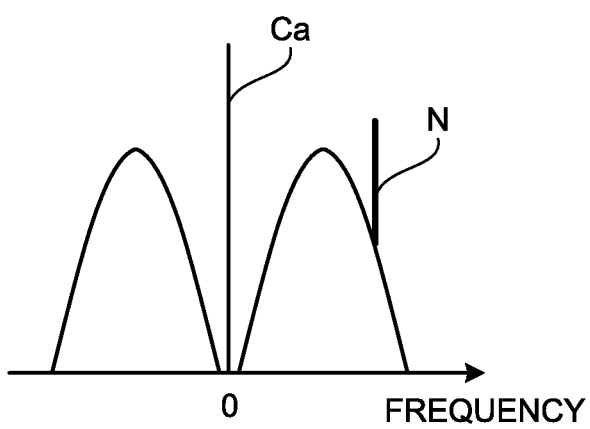
FIG. 6 is a diagram that illustrates an example of a spectral intensity that is calculated by a detecting unit.

In detail, the detecting unit 7 executes a Fast Fourier Transform (fast Fourier transformation: FFT) process for a received signal to calculate a spectral intensity of each frequency component. FIG. 6 is a diagram that illustrates an example of a spectral intensity that is calculated by the detecting unit 7.

As illustrated in FIG. 6, a spectral intensity of a received signal is symmetric with respect to a carrier wave Ca but is asymmetric in a case where a noise N is included therein. Accordingly, whereas the detecting unit 7 determines that a noise is present in a received signal in a case where a spectral intensity of such a received signal is asymmetric with respect to a carrier wave Ca, it is possible to determine that a noise is absent in such a received signal in a case where it is symmetric.

Additionally, a process of detecting presence or absence of a noise of a received signal as described above is merely illustrative and is not limited. Furthermore, a received signal to obtain a frequency spectrum in the above is a signal from the synchronous detection unit 3 and is not limited thereto. That is, for a received signal to obtain a frequency spectrum, any signal, such as, for example, a signal from the RF unit 2, may be used as long as it is possible for such a signal to detect a noise.

Next, a process of detecting presence or absence of over-modulation of a received signal will be explained. Additionally, over-modulation is a state where a modulation factor of a received signal that is a radio broadcasting wave is greater than a specified value (specifically 100%).

For example, it is possible for the detecting unit 7 to detect presence or absence of over-modulation of a received signal based on an I-component I2 that is output from the adaptive filter 4. FIG. 7 is a diagram that illustrates an I-component. Additionally, in FIG. 7, a received signal where a modulation factor thereof is a specified value (namely, 100%) is indicated by a solid line and a received signal with over-modulation is indicated by a dashed-dotted line.

Figures 7, 8:
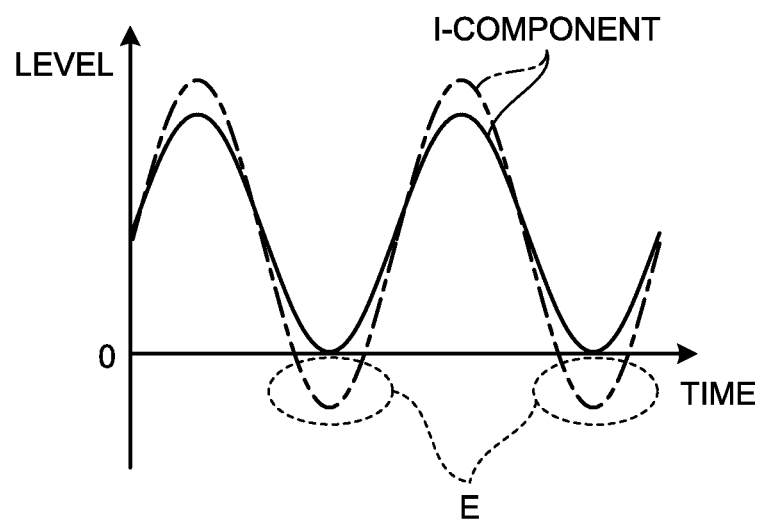
FIG. 7 is a diagram that illustrates an I-component.
FIG. 8 is a diagram that explains switching of an output signal in a switching unit.

As illustrated in FIG. 7, an I-component is set in such a manner that a level thereof has a positive value when a modulation factor is a specified value. On the other hand, for example, in a case where a received signal is over-modulated, an I-component is provided in such a manner that a level thereof has a negative value as indicated by a closed curve E.

Hence, whereas the detecting unit 7 determines that a received signal is over-modulated in a case where an I-component has a negative value, it is possible to determine that a received signal is not over-modulated in a case where an I-component does not have a negative value. Additionally, a process of detecting presence or absence of over-modulation of a received signal as described above is an example and is not limited thereto.

The detecting unit 7 that is configured as described above outputs, to the switching unit 8, a signal that indicates a detected state of a received signal.

Additionally, although the detecting unit 7 in the above is provided to detect a state of variation of a phase of a received signal, presence or absence of a noise of a received signal, and presence or absence of over-modulation of a received signal, one or two of them may be detected. Furthermore, the detecting unit 7 may detect a state of a received signal other than a state of variation of a phase of a received signal or the like.

The switching unit 8 switches an output signal to be output, from among an "output signal A" that is generated by the second envelope detection unit 6, an "output signal B" that is an I-component where a noise is eliminated by the adaptive filter 4, and an "output signal C" that is generated by the first envelope detection unit 5, based on a state of a received signal that is detected by the detecting unit 7.

Switching of an output signal as described above will be explained with reference to FIG. 8. FIG. 8 is a diagram that explains switching of an output signal in the switching unit 8.

Before providing an explanation of FIG. 8, output signals A, B, C will be explained because they have respective states of a received signal that are not readily influenced, in other words, states of a received signal that are dominant over other output signals.

An "output signal A" that is generated by the second envelope detection unit 6 is an output signal that is dominant in a case where a variation of a phase of a received signal is comparatively large and a case where a received signal is over-modulated.

An "output signal B" that is an I-component where a noise is eliminated by the adaptive filter 4 is an output signal that is dominant in a case where a noise is present in a received signal and a case a received signal is over-modulated.

An "output signal C" that is generated by the first envelope detection unit 5 is an output signal that is dominant in any of a case where a variation of a phase of a received signal is comparatively large, a case where a noise is present in a received signal, and a case where a received signal is over-modulated.

As FIG. 8 is explained by taking the above into consideration, for example, in a case where the detecting unit 7 detects a "phase variation" that indicates that a variation of a phase of a received signal is comparatively large, it is possible for the switching unit 8 to switch an output signal that is output actually, to an "output signal A" or an "output signal C", from among output signals A, B, C. Additionally, in FIG. 8, from among output signals A, B, C, output signals that are capable of being switched and output by the switching unit 8 are indicated by circles and other output signals, in detail, output signals that are not output, are indicated by crosses.

Furthermore, in a case where a "beat noise" is detected in the detecting unit 7, it is possible for the switching unit 8 to switch an output signal to be output to an "output signal B" or an "output signal C", from among output signals A, B, C.

Furthermore, in a case where "over-modulation" is detected in the detecting unit 7, it is possible for the switching unit 8 to switch an output signal to be output, from among all of output signals A, B, C.

Furthermore, in a case where a "phase variation" and a "beat noise" are detected in the detecting unit 7, it is possible for the switching unit 8 to switch an output signal to be output to an "output signal C", from among output signals A, B, C.

Furthermore, in a case where a "phase variation" and "over-modulation" are detected in the detecting unit 7, it is possible for the switching unit 8 to switch an output signal to be output to an "output signal A" or an "output signal C", from among output signals A, B, C.

Furthermore, in a case where a "beat noise" and "over-modulation" are detected in the detecting unit 7, it is possible for the switching unit 8 to switch an output signal to be output to an "output signal B" or an "output signal C", from among output signals A, B, C.

Figure 9:
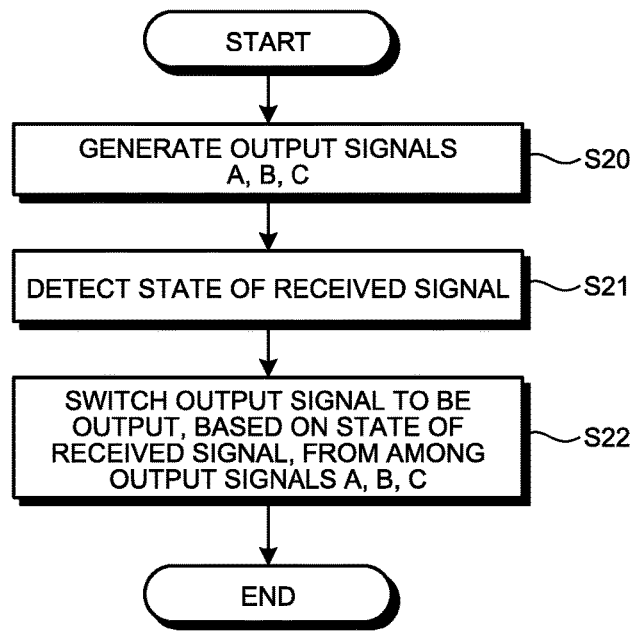
FIG. 9 is a flowchart that explains switching of an output signal in a receiving process according to a second embodiment.

Next, switching of an output signal in a receiving process according to a second embodiment will be explained with reference to FIG. 9. FIG. 9 is a flowchart that explains switching of an output signal in a receiving process according to a second embodiment.

As illustrated in FIG. 9, the receiver 1 generates output signals A, B, C as described above (step S20). Then, the receiver 1 detects a state of a received signal such as a state of variation of a phase of a received signal (step S21).

Then, the receiver 1 switches an output signal to be output, based on a detected state of a received signal, from among output signals A, B, C (step S22).

Thus, the switching unit 8 according to a second embodiment switches an output signal to be output, from among an output signal A that is generated by the second envelope detection unit 6, an output signal B that is an I-component where a noise is eliminated by the adaptive filter 4, and an output signal C that is generated by the first envelope detection unit 5, based on a state of variation of a phase of a received signal, presence or absence of a noise of a received signal, and presence or absence of over-modulation of a received signal.

Thereby, in a second embodiment, it is possible to output an output signal that is suitable for a state of a received signal, and it is possible to reduce degradation of a sound quality of an output signal and eliminate a noise therefrom, for example, in a case where a variation of a phase in a carrier wave of a received signal is comparatively large.

Additionally, the switching unit 8 may switch an output signal to be output, based on one or two of a state of variation of a phase of a received signal, presence or absence of a noise of a received signal, and presence or absence of over-modulation of a received signal.

Third Embodiment

Figure 10:
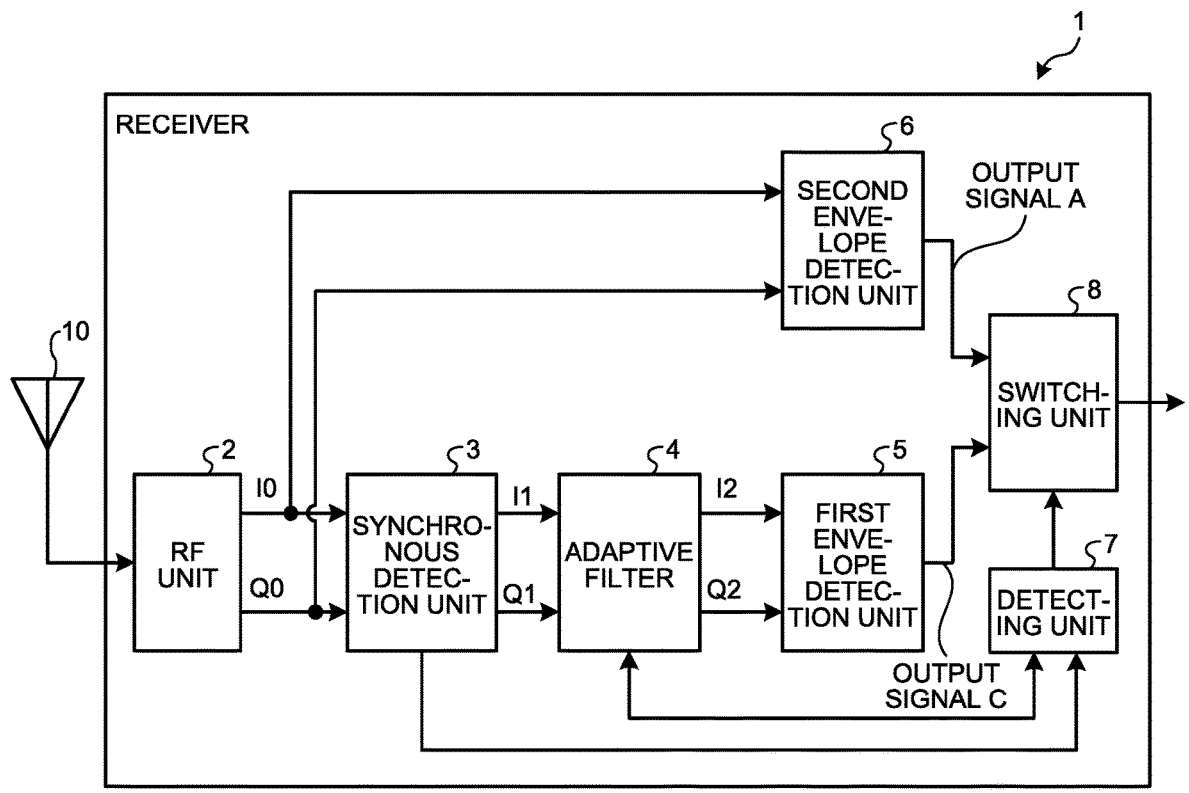
FIG. 10 is a block diagram that illustrates a configuration example of a receiver according to a third embodiment.

Next, a configuration of a receiver 1 according to a third embodiment will be explained with reference to FIG. 10. FIG. 10 is a block diagram that illustrates a configuration example of the receiver 1 according to a third embodiment.

As illustrated in FIG. 10, in the receiver 1 according to a third embodiment, an output signal A that is generated by a second envelope detection unit 6 and an output signal C that is generated by a first envelope detection unit 5 are output to a switching unit 8. Then, the switching unit 8 switches an output signal to be output, from among an output signal A and an output signal C.

Thereby, for example, in a case where an abnormality is caused in an adaptive filter 4, it is possible to switch an output signal to be output from an output signal C that is obtained through the adaptive filter 4 to an output signal A that is obtained not through the adaptive filter 4, where this will be described later.

Herein, as described above, the adaptive filter 4 executes a process of determining a filter coefficient in such a manner that a noise is detected from a Q-component and a detected noise is eliminated. Furthermore, the adaptive filter 4 repeats such a process to update a filter coefficient, and hence, such a filter coefficient converges to a suitable value.

However, as described above, in a case where a variation of a phase of a received signal is comparatively large, it may be impossible to attain synchronization of a phase in synchronous detection, so that a sound signal may be included in a Q-component. In such a case, the adaptive filter 4 may not normally function, so that degradation of a sound quality of an output signal that is caused by including a sound signal in a Q-component may be caused. Even in such a situation, it is desirable to update a filter coefficient as much as possible to attain convergence of a filter coefficient to a suitable value.

Hence, in a third embodiment, a filter coefficient of the adaptive filter 4 is updated depending on a state of variation of a phase of a received signal and presence or absence of an sound signal that is included in a received signal. Thereby, it is possible to attain convergence of a filter coefficient of the adaptive filter 4 to a suitable value.

For example, in a case where a detecting unit 7 detects that an amount of variation of a Q-component that is generated by a synchronous detection unit 3 is within a predetermined range (see a closed curve D in FIG. 5), a variation of a phase of a received signal is comparatively small, so that the adaptive filter 4 updates a filter coefficient.

Thereby, it is possible to attain convergence of a filter coefficient of the adaptive filter 4 to a suitable value. That is, in a case where a variation of a phase of a received signal is comparatively small, synchronization is attained in synchronous detection, so that it is possible to update a filter coefficient suitably even if a sound signal is included in a Q-component.

Furthermore, for example, in a case where the detecting unit 7 detects that an amount of variation of a Q-component that is generated by the synchronous detection unit 3 is outside a predetermined range and a sound signal is not included in a received signal, the adaptive filter 4 updates a filter coefficient. That is, a sound signal is not included in a Q-component, so that it is possible for the adaptive filter 4 to update a filter coefficient suitably.

Furthermore, for example, in a case where the detecting unit 7 detects that an amount of variation of a Q-component that is generated by the synchronous detection unit 3 is outside a predetermined range and a sound signal is included in a received signal, the adaptive filter 4 does not update a filter coefficient. That is, a sound signal is included in a Q-component, and hence, updating of a filter coefficient is not executed, so that it is possible to prevent such a filter coefficient from converging to an unsuitable value and it is possible to reduce degradation of a sound quality of an output signal.

As a configuration is provided in such a manner that updating of a filter coefficient is not executed in a case where a sound signal is included in a received signal as described above, it may take time for a filter coefficient to converge to a suitable value if such a filter coefficient is an abnormal value.

Hence, in a third embodiment, the detecting unit 7 determines whether or not a filter coefficient is a preset and predetermined value or greater, and notifies, when it is determined that such a filter coefficient is such a predetermined value or greater, a switching unit 8 of such a thing.

Then, the switching unit 8 that receives such a notification switches an output signal to be output, from an output signal C that is generated by the first envelope detection unit 5 to an output signal A that is generated by the second envelope detection unit 6.

That is, in a case where an abnormality is caused in the adaptive filter 4, an output signal to be output is switched from an output signal C that is obtained through the adaptive filter 4 to an output signal A that is obtained not through the adaptive filter 4. Thereby, it is possible to prevent a filter coefficient from being an abnormal value for a long period of time.

Next, switching of an output signal or the like in a receiving process according to a third embodiment will be explained with reference to FIG. 11. FIG. 11 is a flowchart that explains switching of an output signal or the like in a receiving process according to a third embodiment.

As illustrated in FIG. 11, the receiver 1 generates output signals A, C as described above (step S30). Then, the receiver 1 detects a state of a received signal such as a state of variation of a phase of a received signal, and a state of the adaptive filter 4 (step S31).

Then, the receiver 1 updates a filter coefficient of the adaptive filter 4 based on a detected state of a received signal (step S32). Then, the receiver 1 switches an output signal to be output, based on a detected state of the adaptive filter 4, from among output signals A, C (step S33).

It is possible for a person skilled in the art to readily derive additional effects or variations. Hence, a broader aspect of the present invention is not limited to specific details and representative embodiments as illustrated and described above. Therefore, various modifications are allowed without departing from a spirit or a scope of a general inventive concept as defined by the appended claims and equivalents thereof.

REFERENCE SIGNS LIST

1 receiver
2 synchronous detection unit
4 adaptive filter
5 envelope detection unit
6 second envelope detection unit
8 switching unit

The invention claimed is:

1. A receiver, comprising:
a synchronous detection unit that synchronously detects a received signal to generate an I-component and a Q-component;
an elimination unit that eliminates a noise from the I-component based on the Q-component that is generated by the synchronous detection unit; and
a first envelope detection unit that envelope-detects the I-component where the noise is eliminated by the elimination unit and the Q-component to generate a first output signal;
a second envelope detection unit that envelope-detects the received signal to generate a second output signal; and
a switching unit that switches an output signal to be output, from among the second output signal that is generated by the second envelope detection unit, a third output signal that is the I-component where the noise is eliminated by the elimination unit, and the first output signal that is generated by the first envelope detection unit, based on at least one of a state of variation of a phase of the received signal, presence or absence of a noise in the received signal, and presence or absence of over-modulation of the received signal.

2. A receiver, comprising:
a synchronous detection unit that synchronously detects a received signal to generate an I-component and a Q-component;
an elimination unit that eliminates a noise from the I-component based on the Q-component that is generated by the synchronous detection unit;
a first envelope detection unit that envelope-detects the I-component where the noise is eliminated by the elimination unit and the Q-component to generate a first output signal;

a second envelope detection unit that envelope-detects the received signal to generate a second output signal; and a switching unit that switches an output signal to be output from among the second output signal that is generated by the second envelope detection unit and the first output signal that is generated by the first envelope detection unit.

3. The receiver according to claim 2, wherein the elimination unit is an adaptive filter that eliminates noise by a filter process that uses a filter coefficient, and the switching unit switches an output signal to be output, from the first output signal that is generated by the first envelope detection unit to the second output signal that is generated by the second envelope detection unit, in a case where the filter coefficient is a preset and predetermined value or greater.

4. The receiver according to claim 2, wherein the elimination unit is an adaptive filter that eliminates noise by a filter process that uses a filter coefficient, and executes updating of the filter coefficient depending on at least one of a state of variation of a phase of the received signal and presence or absence of a sound signal that is included in the received signal.

5. The receiver according to claim 4, wherein the elimination unit updates the filter coefficient, in a case where an amount of variation of the Q-component that is generated by the synchronous detection unit, indicating a state of variation of a phase of the received signal, is within a predetermined range.

6. The receiver according to claim 4, wherein the elimination unit updates the filter coefficient, in a case where an amount of variation of the Q-component that is generated by the synchronous detection unit, indicating a state of variation of a phase of the received signal, is outside a predetermined range and a sound signal is not included in the received signal.

7. The receiver according to claim 4, wherein the elimination unit does not update the filter coefficient, in a case where an amount of variation of the Q-component that is generated by the synchronous detection unit, indicating a state of variation of a phase of the received signal, is outside a predetermined range and a sound signal is included in the received signal.

\* \* \* \* \*